Jan. 1, 1952 J. E. EVANS 2,580,903

COLOR TELEVISION SYSTEM

Filed June 2, 1947

INVENTOR.
JOHN E. EVANS
BY Samuel B. Smith
ATTORNEY

Patented Jan. 1, 1952 2,580,903

UNITED STATES PATENT OFFICE 2,580,903

COLOR TELEVISION SYSTEM

John E. Evans, Montgomery Township, Somerset County, N. J., assignor to Radio Corporation of America, a corporation of Delaware Application June 2, 1947, Serial No. 751,918

12 Claims. (Cl. 178—5.2)

My invention relates, in general, to apparatus for the transmission of and reception of pictures or other images by television and, more particularly, to the transmission and reception of televised images in substantially natural color.

At the present time, there are two outstanding methods and systems for transmitting and reproducing televised images in color. The first of these is the so-called sequential type of transmission. The second is the so-called simultaneous type of transmission. In the sequential type of transmission, the image being televised is broken down field by field into its additive component colors and these color fields are scanned in some preselected sequence and signals representative thereof are transmitted. The development of the color field signal representations may be accomplished by the use of a single scansion or camera tube which operates in conjunction with a series of color filters which are moved between the scansion tube and the image being televised in some definite preselected sequence in order to divide the image into its component color fields, or the image may be utilized to form several individual image representations in color and each of these may be passed through a fixed color filter to a scansion tube whose function is to develop signals representative of one of the component colors of the televised image. By the use of appropriate commutating means, it can be arranged so that each scansion tube will, in the latter arrangement, in some preselected sequence, scan a field of color of the image being televised and the signals representative of each of the color fields so derived are transmitted sequentially. One sequential type of trasmission is shown, for instance, in U. S. Patent No. 2,413,075, granted on December 24, 1946 to Otto H. Schade and entitled "Method and System for Developing Television Signals." Reproduction of the image is accomplished generally by the provision of a cathode ray tube for reproducing light values of the received sequentially transmitted signal representations and a series of color filters are moved between the reproducing tube and the observer in synchronism with the movement of the color filters in the transmitter.

A second type of color transmission contemplates that the image being televised be utilized to form several individual images representative thereof, and this is usually done with the aid of partially transparent reflecting members or dichroic filters or mirrors, such as were disclosed by G. L. Dimmick in the "Journal of the Society of Motion Picture Engineers," vol. 38, January 1942, at pages 36 to 44. By using appropriate component color filters interposed between each of the optical images so derived and a scansion apparatus or camera, all of the color fields so formed may be scanned and signals representative of the color values thereof are developed simultaneously. The signals so developed are then transmitted simultaneously in contradistinction to the sequential system in which the signals representative of the color fields are transmitted in some preselected sequence. One such transmitting system is shown, for instance, in the article appearing in the publication "Electronic Industries" for December, 1946, at page 58 et seq.

The simultaneous type of transmission has some distinct advantages over the sequential type of color television transmission and possibly one of the greatest of these advantages resides in the fact that the signals representative of one of the component colors of the image (and it is usually the green component color) may be utilized by a black and white or monochromatic type of television receiver to give a monochromatic representation of the image being televised. It is to the so-called simultaneous type of color television transmission that the present invention particularly pertains, but it is not necessarily limited thereto.

Another of the advantages of the simultaneous type of color television transmission is that it avoids so-called "pick-up" or "fringe" effects so often present in some types of sequential systems. If a rapid movement of the eye of the observer is made across the image reproducing screen, he may get the effect of seeing the image in such a manner that it appears to him that the image has been broken down into a plurality of distinct component colors. Thus, the effect of seeing the image in a simulation of its natural colors is lost and the image must be viewed as a sequence of unnatural changing colors rather than in its component color integrated form.

Again, the undesirable effect of color flicker is avoided by the use of the simultaneous system, since, under the sequential system, flicker is much more pronounced on the eye of the observer. It is, accordingly, one of the objects of my invention to provide improved apparatus for transmitting and reproducing a televised image in colors and to provide an improved system of the simultaneous type.

The signal representations which are derived by scansion and which are representative of the optical values of the component colors of the image each may be used to modulate a generated carrier and the plurality of carriers so modulated may be transmitted, received and reproduced by appropriate means. On the other hand, a plurality of subcarrier frequencies, spaced apart by predetermined amounts, may be generated and, where a three component color system is used, the main carrier may be modulated directly by the signal representations of one of the component colors and the main carrier may be modulated by the subcarriers, each of which has been modulated in accordance with the signal representations of one of the component colors. A transmission apparatus of this form is set forth in a U. S. Patent No. 2,513,159 issued to Gordon L. Fredendall on June 27, 1950 and entitled "Color Television Transmitter." The present invention relates, in part, to an improved arrangement of this general nature and it is, therefore, a further object of the present invention to provide color television transmission apparatus in which a main carrier is transmitted which has been modulated simultaneously with signal representations of a plurality of the component colors of an image being televised.

In the present transmitting apparatus, all of the frequencies used, other than the derived color signal representations, are derived from a single generating source and hence all frequencies are spaced apart by predetermined amounts which are maintained definitely and automatically spaced apart, and it is a still further object of the present invention to provide color television transmission apparatus in which this is a feature.

It is an additional object of my invention to provide improved apparatus for receiving and reproducing signal representations that have been transmitted in the general manner hereinbefore indicated.

Other objects and advantages will become apparent to those skilled in the art to which this invention belongs from a reading of the hereinafter appended specification.

My invention, in general, contemplates the provision at the transmitter of a source of oscillations of fixed frequency and such a stable source has been provided by a piezoelectric oscillator whose output frequency has been, for purposes of illustration and convenience, 2 megacycles. The output frequency so generated has been frequency multiplied by the use of harmonic amplifiers to an arbitrary frequency which is high in value and which, for purposes of convenience, may be assumed to be of the order of 520 mc. The latter frequency, after power amplification, can be utilized as the main carrier frequency or fundamental of the transmitter and may be impressed onto an antenna system for radiation therefrom after being properly modulated by the signal representations of the component colors of the image being televised.

The stable frequency of 2 megacycles may then be doubled and tripled to provide signals having frequencies of 4 and 6 megacycles respectively. The 2, 4, and 6 mc. frequencies each may be impressed onto the input circuit of a balanced modulator and each of the balanced modulators has impressed thereon the signal representations of the image being televised developed by well known television camera apparatus.

The outputs of each of the balanced modulators is passed through a side band filter for at least partially suppressing one of the side bands of the signal output therefrom. The outputs of all of the side band filters then are passed to a modulating unit where they modulate the main carrier. The modulated main carrier then is passed through a side band filter for the purpose of either totally or at least partially suppressing one set of side bands formed during the modulation of the main carrier by the outputs of the balanced modulators.

There is derived, additionally, a signal which is a harmonic of the stable frequency of 2 mc. and, in practice, this has been the sixth harmonic having a 12 mc. frequency. This signal is impressed in an unmodulated state directly onto the main carrier and is radiated or otherwise transmitted to a receiving arrangement along with the modulating signal representations of the component colors of the televised image.

The signals which have been transmitted may be received by receiving means and, after conventional detection and intermediate frequency amplification and second detection, the output of the second detector will contain the 2, 4, and 6 megacycle modulated subcarriers along with the unmodulated 12 mc. subcarrier. If desired, this latter subcarrier may be modulated at the transmitter approximately 50% with speech so as to function as the sound system. This would necessitate the use of a limiter at the receiver for removing the sound undulations. This, of course, precedes any frequency division of the 12 mc. note. In addition, a detector in the 12 mc. channel at the receiver will also be required with the necessary following speech amplification. These detected signals are then passed through appropriate filters for selecting the 2, 4, and 6 mc. modulated subcarriers. Additionally, the 12 mc. unmodulated subcarrier is passed through a series of frequency dividing circuits and there is derived from the latter a series of unmodulated subcarriers of 2, 4, and 6 mc. respectively. These frequencies may be combined with the signal output of the filters for selecting the 2, 4, and 6 mc. modulated subcarriers and the combined signals then are passed to appropriate detectors, the output of which will contain the original modulation frequencies representative of each of the component colors of the image being televised, and these signals may be used with appropriate reproducing apparatus for reproducing the image in a simulation of its natural colors.

My invention will best be understood by reference to the drawings in which.

Figure 1:
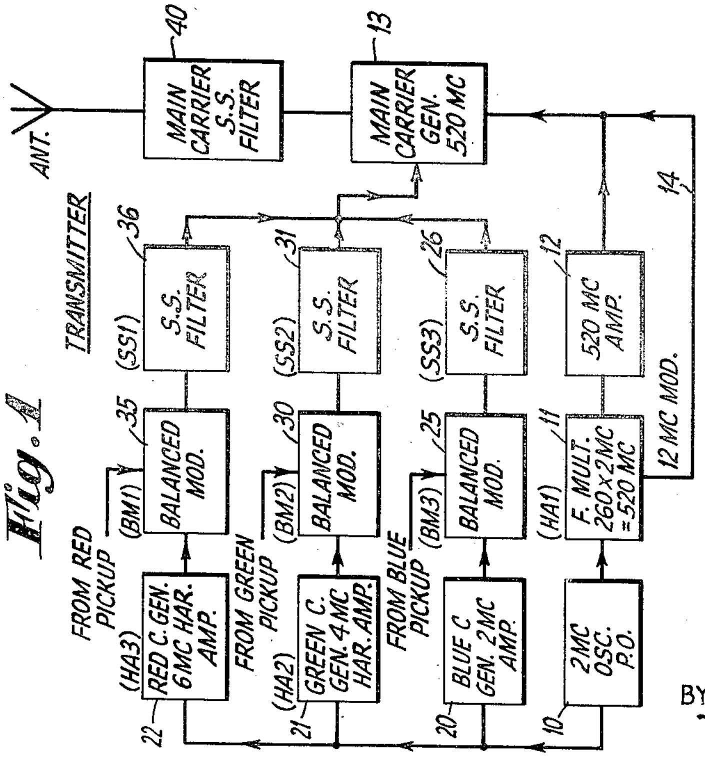
Fig. 1 is a schematic block diagram representation of a color television transmitter in accordance with the present invention.

Referring to Fig. 1, there is shown a block diagram representation of a color television transmitter which has been constructed in accordance with my invention. In this arrangement, there is provided a stable source of oscillation P. O. which is identified by the reference numeral 10 and which has been selected as having an arbitrary value of 2 mc. One output of this oscillator is fed to a series of frequency multiplying circuits 11 which have been identified as harmonic amplifiers, that is to say, circuits which are receptive to the harmonic of an input wave and which will amplify the value of the wave while effectively frequency multiplying it. Harmonic amplifiers per se are well known in the art to which this invention belongs and could be, for example, such as shown in U. S. Patent No. 2,152,759 to Murray G. Crosby, granted April 4, 1939. The frequency multiplication of the 2 mc. note is carried to the point where the output frequencey of one of the harmonic amplifiers has an arbitrary value of 520 mc., for example. This latter note may be amplified by amplifier 12 and the output of the latter is impressed onto a unit 13 in which modulation of this signal may be accomplished and further power amplification thereof may be made if desired. The element 13 has been legended as a main carrier generator.

During the harmonic amplification and frequency multiplication of the 2 mc. note by the harmonic amplifiers 11, there may be produced in this system at some point a note which is the sixth harmonic of the 2 mc. note and this signal, which will have a frequency of 12 mc., is also impressed via appropriate conductors 14 onto the main carrier generator in an unmodulated state or, as has been indicated hereinbefore, this subcarrier could be about 50 per cent amplitude modulated, if desired, with sound representations.

Another of the outputs of the stable oscillator source 10 may be fed via appropriate conducting means to the inputs of three ampliying circuits 20, 21 and 22 respectively, the latter two amplifiers being harmonic amplifiers. The output of ampifier 20 will be a 2 mc. note, the output of amplifier 21 will be a 4 mc. note and the output of amplifier 22 will be a 6 mc. note.

The output of amplifier 20 is impressed onto a balanced modulator circuit 25. Such modulators are well known per se and will not be explained in detail here. One such form of modulator is shown, for instance, in U. S. Patent No. 2,183,795, granted December 19, 1939 to Harold O. Peterson. There is also impressed onto the balanced modulator 25 the signal representations which have been developed and which are representative of one of the component colors of the image which is being televised and, in this illustration, this has been indicated as being the signal representative of the blue component of the image. The method of developing these signal representations and the apparatus therefor is well known per se and, in its broadest concept, comprises scansion means and optical means interposed between the scansion means and the image and which will allow the passage therethrough to the scansion means of only one of the component colors of the image. This is shown schematically, for instance, in the Fredendall application hereinbefore referred to and, since the method and apparatus for developing the signal representations are not the essence of this invention, and are well known, they will not be described in detail here.

The output signal from the balanced modulator 25 will contain essentially no subcarrier frequency of 2 mc. during the periods when no color signal representation is impressed onto the modulator. Upon the application of a color signal representation, however, to the balanced modulator 25, an output will be obtained therefrom which contains only the upper and lower side bands of the modulation frequencies around a center note of 2 mc. These side bands, which are symmetrically located about the suppressed subcarrier, may then be passed through a single side band filter 26 for suppressing one of the side bands and the side band which is suppressed is a matter of choice. The output of the side band filter 26 then is impressed by means of appropriate conductors onto the main carrier generator 13 where it modulates the 520 mc. note.

In a similar manner, the 4 mc. output note from the harmonic amplifier 21 is impressed onto the input circuit of a balanced modulator 30 which also has impressed thereon the signal representations of another of the component colors of the image being televised, and which, in this illustration, has been shown as being the representations of the green component color of the image. The output of balanced modulator 30 is impressed onto a side band filter 31 which will suppress either completely or partially one of the side bands of the output of the balanced modulator 30 and, in turn, the output of side band filter 31 may be impressed onto the main carrier generator 13 where it will modulate the 520 mc. note.

Similarly, the 6 mc. output note from the harmonic generator 22 may be impressed onto a balanced modulator 35 which also has supplied thereto the signal representations of a third of the component colors of the image being televised and which, in this illustration, is represented as being the red component color. The output of balanced modulator 35 may then be passed through side band filter 36 for suppressing, or partially suppressing, one of the side bands of the signal and the output of the filter 36 may be impressed onto the main carrier generator 13 for modulating the 520 mc. note.

The 520 mc. frequency signal of the main carrier generator 13, which has been modulated by the signal outputs of side band filters 26, 31, and 36, and by the unmodulated or partially modulated 12 mc. note conducted thereto by conducting means 14, is passed through a side band filter 40 for suppressing or partially suppressing a selected side band of the signal output of the main carrier generator 13. The output of filter 40 may be impressed onto an antenna for radiation to reproducing apparatus, or it may be transmitted to the reproducing apparatus by other well known means such as coaxial cables or the like.

The side band filters which are contained in block diagram do not of themselves comprise the essence of this invention and are well known to the art to which this invention belongs and, accordingly, will not be explained in detail here. Filters of this nature have been shown, for instance, in the Fredendall application hereinbefore referred to and may be made in accordance with the teachings of the book entitled "Transmission Networks and Wave Filters" by T. E. Shea, published by D. Van Nostrand, 1929 edition, and further filters of this type have been shown in one form thereof and explained in the text "Television Engineering" (see page 289, for example) by D. G. Fink, published by McGraw-Hill Book Company, 1940 edition.

Figure 2:
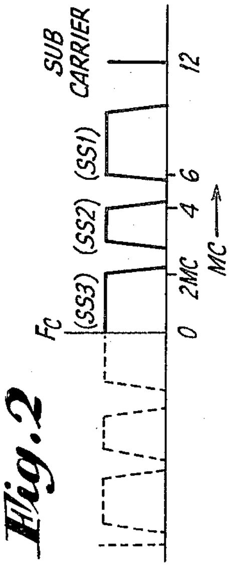
Fig. 2 is a set of explanatory curves.

Referring to Fig. 2, there is shown an explanatory curve in which the relative arrangement of the side bands of the modulated main carrier with respect to the carrier itself is shown as well as a representation of an unmodulated 12 mc. note. The transmitted portions are shown in continuous lines, whereas the portions suppressed by the side band filter 40 are shown in dotted lines. It will be noted that, purely as a matter of choice, there is shown the fact that the output of side band filter 26 has been the lower side band of the 2 mc. subcarrier which has been modulated by the blue color signal representations and the lower side band has been selected for transmission of the signal output from balanced modulator 30 which has been modulated in accordance with the green color signal representations and the upper side band of the 6 mc. note which has been modulated by the red color signal representations has been transmitted. The main carrier is illustrated as the frequency $F_c$ and the frequencies listed in megacycles thereabout are frequency spacings from this main carrier.

Figure 3:
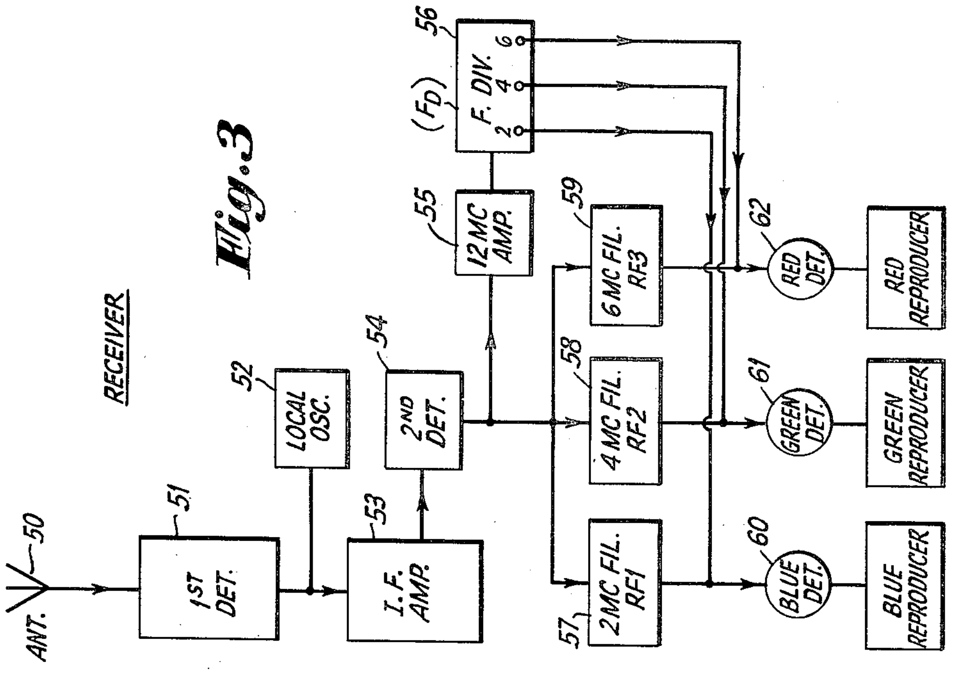
Fig. 3 is a schematic block diagram representation of a receiver or reproducing apparatus in accordance with my invention.

Referring to Fig. 3, there is shown schematically in block diagram form an apparatus for reproducing the signals transmitted by the transmitter of Fig. 1. The signals which have radiated from the transmitter antenna are received by antenna 50 and are impressed onto a first detector 51. The output of 51, after being combined with signals from the local oscillator 52, is passed through an intermediate frequency amplifier 53 and thence to a second detector 54. The output of the second detector will approximate the curve of Fig. 2 minus the carrier $F_c$.

The 12 mc. unmodulated note which appears in the output of the second detector may be passed through amplifier 55 and thence to a series of frequency dividers 56. These frequency dividers may take the form of sub-harmonic amplifiers and, in general, may be of the form of the harmonic amplifiers referred to in Fig. 1. At some points in the frequency dividers, there will appear signals of 6, 4, and 2 mc., respectively, if the frequency division be made in each case by taking the one-half harmonic of the signal impressed onto the circuit.

The modulated 2, 4, and 6 mc. subcarriers may then be selected by means of band pass filters 57, 58 and 59, respectively. These filters may be constructed in accordance with the teachings in the Shea and Fink texts referred to hereinbefore in this specification.

The frequencies of 2, 4, and 6 mc. from the frequency divider 56 are then combined with the outputs of filters 57, 58 and 59, respectively, and these combined notes are passed to a detector in each instance for deriving the signal representations of one of the component colors of the image being televised. The signal representatives of the blue component color of the image may be passed to the element 60 which bears the legend "blue detector," and, similarly, the outputs of filters 58 and 59, which have been combined with the 4 and 6 mc. notes respectively, may be passed to detector 61 and detector 62, respectively, which are identified by the legends "green detector" and "red detector."

After detection, the signals may be passed to appropriate amplifying means, if desired, and after suitable amplification, may be passed to appropriate apparatus for reproducing the colors represented by each of the signals.

These reproducers would, in general, comprise kinescopes onto a control grid of which is impressed the signal representations of one of the component colors of the image in order to modulate the cathode ray beam of the kinescope in accordance with the values of the signals. The particular color represented by the signal may then be reproduced by providing a phosphor in the kinescope which will fluoresce with a desired color under the influence of electron beam impact. Or the target of the kinescope may be a phosphor which gives a white light under the influence of electron beam impact, and there may be interposed between the position of an observer and the kinescope screen or target an appropriate color filter through which the light from the kinescope may be passed to reproduce a component color field of the image. The reproducing tube or structure per se is not the essence of this invention and such arrangements are well known in the art to which this invention belongs. The outputs of all the reproducers may, by appropriate optical means, be superimposed so that registration of all of the reproducer component color fields provides a registered color image on a screen.

Having now described the invention, what is claimed and desired to be secured by Letters Patent is the following:

What I claim is:

1. A color television transmission apparatus comprising in combination, means for developing signal representations of a plurality of the component colors of the image being televised, a source of oscillations of fixed frequency, means for deriving a plurality of electrical signals from said oscillations of fixed frequency and whose frequencies are spaced apart and which bear a harmonic relationship in frequency to the frequency of the fixed frequency, and means for modulating each of the derived frequencies with the exception of two with the signal representations of at least one different of the component colors of the image being televised and modulating one of said unmodulated electrical signals with all the other of said electrical signals.

2. In color television apparatus, means for deriving signal representations of a plurality of the component colors of the image being televised, a source of oscillations of predetermined frequency, means for deriving from said source of oscillations a fundamental frequency carrier wave having a frequency value bearing a harmonic relationship to the frequency of the oscillations, means to derive a plurality of subcarriers under the influence of the oscillations and of a frequency bearing a harmonic relationship to that of the oscillations, means to modulate all but one of said subcarriers in accordance with the values of the signal representations of one of the component colors of the image being televised, means for modulating the fundamental frequency with a single sideband representation of the modulated subcarriers and means for modulating said fundamental frequency with said unmodulated subcarrier.

3. Apparatus in accordance with claim 2 wherein the unmodulated carrier has a frequency higher than any of the other of said subcarriers.

4. A color television apparatus, comprising means for deriving signal representations of a plurality of the component colors of the image being televised, a source of oscillations of predetermined frequency, means for developing under the influence of the oscillations four different subcarriers whose frequencies are in harmonic relationship to the oscillation frequency, means for modulating three of the subcarrier frequencies in accordance with the values of the signal representations of three different of the component colors of the image being televised, single sideband filter means, means for impressing the modulated subcarriers onto said filter means, and means for transmitting signal representations of the output signals from said filter means and the remaining unmodulated subcarrier.

5. Apparatus in accordance with claim 4 wherein there is provided, in addition, means for developing a fundamental frequency under the influence of the oscillations which is a harmonic of the oscillation frequency, and means for modulating the fundamental with the signal representations from the output of the filter means and the unmodulated subcarrier.

6. Apparatus in accordance with claim 5 wherein there is provided, in addition, a second single sideband filter means, means for impressing the modulated fundamental onto said filter means, and means for transmitting said modulated fundamental.

7. In color television transmission apparatus wherein signal representations are developed of a plurality of the component colors of the image being televised, a source of oscillations of predeterminable frequency, means to derive under the influence of the oscillations a plurality of subcarrier frequencies spaced apart in frequency from each other and bearing a harmonic relationship to the frequency of the oscillations, means for modulating each of the subcarrier frequencies in accordance with the values of the signal representations of one different of the component colors of the image being televised, means to derive under the influence of the oscillations an unmodulated sine wave signal whose frequency is a harmonic of the oscillation frequency, and means including single side band filters for transmitting signal side band signal representations of the modulated subcarriers and the unmodulated sine wave harmonic of the oscillation frequency.

8. Apparatus in accordance with claim 7 wherein there is provided, in addition, means for deriving a fundamental signal frequency under the influence of the oscillations and which signal has a frequency which is a harmonic of the oscillation frequency, means for modulating the fundamental frequency with the unmodulated harmonic and with single side band signal representations of the modulated subcarriers, and means for transmitting the modulated fundamental wave.

9. In a color television receiver for receiving and reproducing signal representations of a plurality of the component colors of an image being televised and wherein said signals contain representations of subcarrier frequencies which have been modulated in accordance with the values of the color signal representations, means to detect the received signals, means for receiving an unmodulated subcarrier and for supplying therefrom waves of the subcarrier frequencies, means to combine the supplied waves with the detected signal color representations and means for reproducing representations of the combined signals to reproduce the optical image being televised in a simulation of its natural colors.

10. In a color television receiver for receiving and reproducing signal representations of a plurality of the component colors of an image being televised and wherein said signals contain representations of subcarrier frequencies which have been modulated in accordance with the values of the color signal representations and contain an unmodulated wave of predetermined frequency, means to detect the received signals, means for deriving from the unmodulated wave of predetermined frequency a series of waves bearing a harmonic relationship thereto and having the frequency of the subcarrier frequencies, means to combine the detected waves with signals from the derived series of waves, and means for reproducing representations of the combined signals to reproduce the optical image being televised in a simulation of its natural colors.

11. In a color television receiver for receiving and reproducing signal representations of a plurality of the component colors of an image being televised and wherein said signals contain representations of subcarrier frequencies all but one of which have been single sideband modulated in accordance with the values of the color signal representations, means to detect the received signals, means to select and separate the signal representations of the subcarrier frequencies which have been modulated in accordance with the values of the color signal representations, means to receive said unmodulated subcarrier, means to derive therefrom a plurality of unmodulated signals each having a frequency corresponding to that of one of the subcarrier frequencies, means to combine each of the derived signals with the signal of like frequency which is representative of a modulated subcarrier frequency, and means for reproducing signal representations of all of the combined signals to reproduce the televised image in a simulation of its natural colors.

12. In a color television receiver, receiving and reproducing signal representations of a plurality of the component colors of an image being televised and wherein said received signals contain representations of a plurality of subcarrier frequencies all but one of which has been single sideband modulated in accordance with the values of the color signal representations and wherein said subcarrier frequencies bear a harmonic relationship each to the other, means for detecting said received signals, frequency dividing means, means to impress the unmodulated wave onto the frequency dividing means to derive therefrom a series of frequencies each of which corresponds to the frequency of one of the subcarrier frequencies, filter means, means for impressing the signals representative of the modulated subcarrier frequencies onto said filter means to separate and select said signals, means for combining one of the frequencies derived from the frequency divider means with each of the selected modulated subcarrier signal representations, means for detecting each of the combined signals, and means for reproducing all of the latter detected signals to reproduce the televised image in a simulation of its natural color.

JOHN E. EVANS.

REFERENCES CITED

The following references are of record in the file of this patent:

UNITED STATES PATENTS

| Number | Name | Date |
|---|---|---|
| Re. 20,700 | Carlson | Apr. 19, 1938 |
| 2,056,607 | Holmes | Oct. 6, 1936 |
| 2,188,499 | Curtis | Jan. 30, 1940 |
| 2,205,469 | Curtis | June 25, 1940 |
| 2,208,922 | Butler | July 23, 1940 |
| 2,233,183 | Roder | Feb. 25, 1941 |
| 2,270,539 | Malling | Jan. 20, 1942 |
| 2,291,277 | Case | July 28, 1942 |
| 2,298,409 | Peterson | Oct. 13, 1942 |
| 2,309,678 | Smith | Feb. 2, 1943 |
| 2,335,180 | Goldsmith | Nov. 23, 1943 |
| 2,350,536 | Schlesinger | June 6, 1944 |
| 2,513,159 | Fredendall | June 27, 1950 |